US012750077B1

(12) United States Patent
Ponnaluri et al.

(10) Patent No.: US 12,750,077 B1
(45) Date of Patent: Sep. 29, 2026

(54) LOW POWER, LIGHT WEIGHT, ANTI-JAMMING GPS ANTENNA

(71) Applicant: BlueHalo Labs, LLC, Albuquerque, NM (US)

(72) Inventors: Satya Ponnaluri, North Potomac, MD (US); Yik-Kiong Hue, Potomac, MD (US); Shan Chiang, North Potomac, MD (US); Ali Namazi, McLean, VA (US); Babak Azimi-Sadjadi, Potomac, MD (US)

(73) Assignee: BlueHalo Labs, LLC, Albuquerque, NM (US)

( * ) Notice: Subject to any disclaimer, the term of this patent is extended or adjusted under 35 U.S.C. 154(b) by 202 days.

(21) Appl. No.: 18/819,588

(22) Filed: Aug. 29, 2024

Related U.S. Application Data

(60) Provisional application No. 63/537,798, filed on Sep. 11, 2023.

(51) Int. Cl.
*H04B 1/04* (2006.01)
*H04B 1/10* (2006.01)

(52) U.S. Cl.
CPC ......... *H04B 1/0475* (2013.01); *H04B 1/0458* (2013.01); *H04B 1/1018* (2013.01)

(58) Field of Classification Search
CPC ... H04B 1/0475; H04B 1/0458; H04B 1/1018
See application file for complete search history.

(56) References Cited

U.S. PATENT DOCUMENTS 6,166,690 A * 12/2000 Lin ......................... G01S 19/21 342/383
10,031,234 B1 * 7/2018 Alexander .............. G01S 19/53
11,894,899 B1 * 2/2024 Wang ................... H04B 7/0617
(Continued)

FOREIGN PATENT DOCUMENTS

WO WO-2014210518 A1 * 12/2014 ............ H04B 1/123

*Primary Examiner* — William Lu
(74) *Attorney, Agent, or Firm* — Amster, Rothstein & Ebenstein LLP

(57) ABSTRACT

A system including (A) N antennas and (B) N interference cancellation modules, each including: (i) a first input port configured to receive an electrical signal which includes a global navigation satellite system portion and an interference portion; (ii) a first bandpass filter; (iii) a first low noise amplifier; (iv) M shifters; and (v) M attenuators, each attenuator is connected to a respective phase shifter. The system further includes (C) M analog signal combiners, each analog signal combiner connected to a respective attenuator; (D) M analog power splitters, each analog power splitter connected to a respective analog signal combiner, and each analog power splitter is configured to provide a respective output; and (E) a control module operably connected to the M analog power splitters and to the N interference cancellation modules. The control module includes: (i) an analog power detector connected to the M analog power splitters to obtain the respective output of the M analog power splitters and to provide power measurements based; and (ii) a microcontroller configured to: (a) obtain the power measurements; and (b) deliver digital control commands to the N interference cancellation modules based on the power measurements.

20 Claims, 4 Drawing Sheets

(56) References Cited

U.S. PATENT DOCUMENTS

| | | | | |
|---|---|---|---|---|
| 11,943,818 | B2 * | 3/2024 | Lipowski | H04B 1/0057 |
| 2005/0226353 | A1 * | 10/2005 | Gebara | H04B 1/1027 375/346 |
| 2006/0064725 | A1 * | 3/2006 | Rabinowitz | G01S 19/46 342/357.31 |
| 2008/0287076 | A1 * | 11/2008 | Shen | H04B 1/0475 455/114.3 |
| 2010/0073217 | A1 * | 3/2010 | Martin Neira | G01S 13/882 342/120 |
| 2012/0262328 | A1 * | 10/2012 | Shinonaga | H01Q 3/36 342/368 |
| 2012/0299765 | A1 * | 11/2012 | Huang | H01Q 21/20 342/81 |
| 2013/0051492 | A1 * | 2/2013 | Hansen | H04B 1/0475 375/297 |
| 2016/0226653 | A1 * | 8/2016 | Bharadia | H04B 1/525 |
| 2016/0285504 | A1 * | 9/2016 | Hua | H04B 1/52 |
| 2017/0019272 | A1 * | 1/2017 | Brannon | H04B 1/0042 |
| 2017/0179983 | A1 * | 6/2017 | Choi | H04B 1/1036 |
| 2018/0070364 | A1 * | 3/2018 | Varanese | H04B 1/1027 |
| 2018/0212693 | A1 * | 7/2018 | Harel | H04W 24/02 |
| 2019/0372610 | A1 * | 12/2019 | Choi | H04B 1/10 |
| 2020/0228159 | A1 * | 7/2020 | Raghavan | H04B 1/0475 |
| 2020/0403649 | A1 * | 12/2020 | Alexanderson | H04B 1/0458 |
| 2021/0099199 | A1 * | 4/2021 | Pehlke | H04B 7/0817 |
| 2021/0135833 | A1 * | 5/2021 | Hao | H04L 5/0023 |
| 2021/0136696 | A1 * | 5/2021 | Burke | H04B 1/123 |
| 2022/0286172 | A1 * | 9/2022 | Herschfelt | H04L 1/16 |
| 2022/0407556 | A1 * | 12/2022 | Braun | H04B 1/0053 |

* cited by examiner

LOW POWER, LIGHT WEIGHT, ANTI-JAMMING GPS ANTENNA

RELATED APPLICATIONS

This application claims priority to and the benefit of U.S. Provisional Application No. 63/537,798, filed Sep. 11, 2023 and entitled LOW POWER, LIGHT WEIGHT, ANTI-JAMMING GPS ANTENNA, the contents of which are incorporated herein by reference in their entirety.

STATEMENT OF GOVERNMENT SUPPORT

This invention was made with government support under Contract Nos W56KGU-17-C-0072 awarded by the U.S. Army and FA8750-17-C-0059 awarded by the U.S. Air Force. The government may have certain rights in the invention.

TECHNICAL FIELD

The present invention is related to communications technology, and in particular to global navigation satellite systems.

BACKGROUND OF THE INVENTION

Constellations of global navigation satellite systems (e.g., GPS, Galileo, and Beidou, to name a few) transmit signals that aid in the positioning, navigation and timing of entities on the ground that are equipped with global navigation satellite system receivers. The received signals are extremely weak in strength and are therefore prone to interference by a terrestrial or other emitters operating in the frequency bands reserved to these satellite systems. Conventional systems do not adequately filter out such interference.

As spectrum congestion increases, for example, through spectrum auctions such as AWS-3, the impact of cosite and adjacent channel interference on radio operations will likely increase. For example, sites operating in the 1755-1850 MHz band may experience more interference from cellular transmissions and meteorological ground stations operating in the 1695-1710 MHz band may experience more interference from cellular uplink transmissions. Position, navigation and timing (PNT) signals such as Global Positioning System (GPS) are among the weakest signals received at a receiver (around −132 dBm or −192 dBm/Hz, which is below the thermal noise floor). These receivers are impacted significantly because of cosite interference due to radio operations in for example the 1750-1850 MHz range.

Cosite interference can manifest in at least three forms: out-of-band leakage, ambient noise increase, and in-band spurs. Out-of-band interference not filtered by a band-pass filter can desensitize a GPS receiver. Likewise, even if not active, cosite transmitters may increase ambient noise, impairing a GPS receiver's operation. Finally, in-band spurs from active radios can show up in the GPS bands, significantly impacting the receiver operations. Common methods to mitigate interference include using bandpass filters, but, as discussed, these do not adequately reduce interference; conventional bandpass filters ordinarily result in, at best, a 50 dB decrease in the out-of-band frequencies. Moreover, bandpass filters do not fully mitigate in-band signals, such as spurs from cosite transmissions.

Other forms of interference (e.g., jamming) may significantly impact Global Navigation System (GNS) and/or Position, Navigation and Timing (PNT) receivers.

What is needed is a solution to these and other technical challenges.

SUMMARY OF THE INVENTION

In exemplary embodiments, a system is disclosed. The system comprises: (A) N antennas; (B) N interference cancellation modules, each comprising: (i) a first input port configured to receive an electrical signal from a respective antenna of the N antennas, wherein the electrical signal comprises a global navigation satellite system portion and an interference portion; (ii) a first bandpass filter operably connected to the first input port; (iii) a first low noise amplifier operably connected to the first bandpass filter; (iv) M phase shifters operably connected to the first low noise amplifier; and (v) M attenuators, wherein each attenuator of the M attenuators is operably connected to a respective phase shifter of M phase shifters; (C) M analog signal combiners, wherein each analog signal combiner of the M analog signal combiners is operably connected to a respective attenuator of a respective interference cancellation module of the N interference cancellation modules; (D) M analog power splitters, wherein each analog power splitter of the M analog power splitters is operably connected to a respective analog signal combiner of the M analog signal combiners, and where-in each analog power splitter is configured to provide a respective output; and (E) a control module operably connected to the M analog power splitters and to the N interference cancellation modules, wherein the control module comprises: (i) an analog power detector operably connected to the M analog power splitters, and configured to obtain the respective output of each of the M analog power splitters and to provide power measurements; and (ii) a microcontroller operably connected to the analog power detector, comprising at least one processor and memory, wherein the microcontroller is configured to: (a) obtain the power measurements; and (b) deliver digital control commands to the N interference cancellation modules based on the power measurements. N is an integer and M is an integer.

In embodiments, the digital control commands comprise instructions to set a state of a respective phase shifter of the M phase shifters of a respective interference cancellation module.

In embodiments, the digital control commands comprise instructions to set a state of a respective attenuator of the M attenuators of a respective interference cancellation module.

In embodiments, the respective phase shifter is a numerically controlled analog phase shifter.

In embodiments, at least one attenuator of the M attenuators is a numerically controlled analog attenuator.

In embodiments, each analog power splitter of the M analog power splitters is operably connected to a respective analog signal combiner via a respective second low noise amplifier of a set of M low noise amplifiers.

In embodiments, the system further comprises a second bandpass filter operably connected to the first bandpass filter.

In embodiments, the global navigation satellite system portion is associated with signals in the L1 band. In embodiments, the global navigation satellite system portion is associated with signals in the L2 band. In embodiments, the global navigation satellite system portion is associated with signals in the L5 bands.

In embodiments, N is an integer greater than two. In embodiments, M is an integer greater than two. In embodiments, N is equal to four. In embodiments, N is equal to eight. In embodiments, M is equal to one. In embodiments, M is equal to two. In embodiments, M is equal to three.

In further exemplary embodiments, a method for estimating a covariance matrix of a received RF signal including a global navigation satellite system portion and an interference portion is disclosed. The method comprises (A) providing, by a microcontroller, first digital control commands to control numerically controlled attenuators associated with a plurality of paths to attenuate the received RF signal; (B) providing, by the microcontroller, second digital control commands to control numerically controlled phase shifters to set a phase shift of the numerically controlled phase shifters wherein the numerically controlled phase shifters are included in the plurality of paths associated with the numerically controlled attenuators; (C) estimating diagonal elements of a covariance matrix of the received RF signal from multiple antennae by setting a first attenuation of a first path of interest of the plurality of paths to minimum and a second attenuation of all other paths of the plurality of paths to maximum; (D) receiving, by the microcontroller from an analog power detector, a first power measurement; and (E) estimating nondiagonal elements of the covariance matrix of the received RF signal by the steps of: (i) setting attenuation of two paths of the plurality of paths associated with a covariance matrix element of interest to minimum attenuation and setting all other paths of the plurality of paths to maximum attenuation; (ii) setting a respective phase shift of the two paths associated with the covariance matrix element of interest to zero degrees; (iii) receiving, by the microcontroller from the analog power detector, a second power measurement; (iv) setting phase shift of one of the two paths associated with the covariance matrix element to of interest 90 degrees while keeping attenuation constant; (v) receiving, by the microcontroller from the analog power detector, a third power measurement, and (vi) calculating, using the first, second, and third power measurements, the nondiagonal elements of the covariance matrix.

In embodiments, the method further comprises estimating Eigen values and eigenvectors of the covariance matrix.

In embodiments, the second power measurement is independent of the third power measurement.

Other features and advantages of the present disclosure will become readily apparent from the following detailed description and the accompanying drawings.

The present invention overcomes these and other challenges by providing a system and method to protect GPS signal reception in the presence of cosite and other interference.

Advantages of the present invention include mitigating external interference (tone and wideband) in the GPS L1, L2, and L5 bands, while at the same time allowing GPS signal reception to be operational.

BRIEF DESCRIPTION OF THE DRAWINGS

The above and related objects, features and advantages of the present disclosure will be more fully understood by reference to the following, detailed description of the preferred, albeit illustrative, embodiments of the present disclosure when taken in conjunction with the accompanying figures, wherein.

Figure 1A:
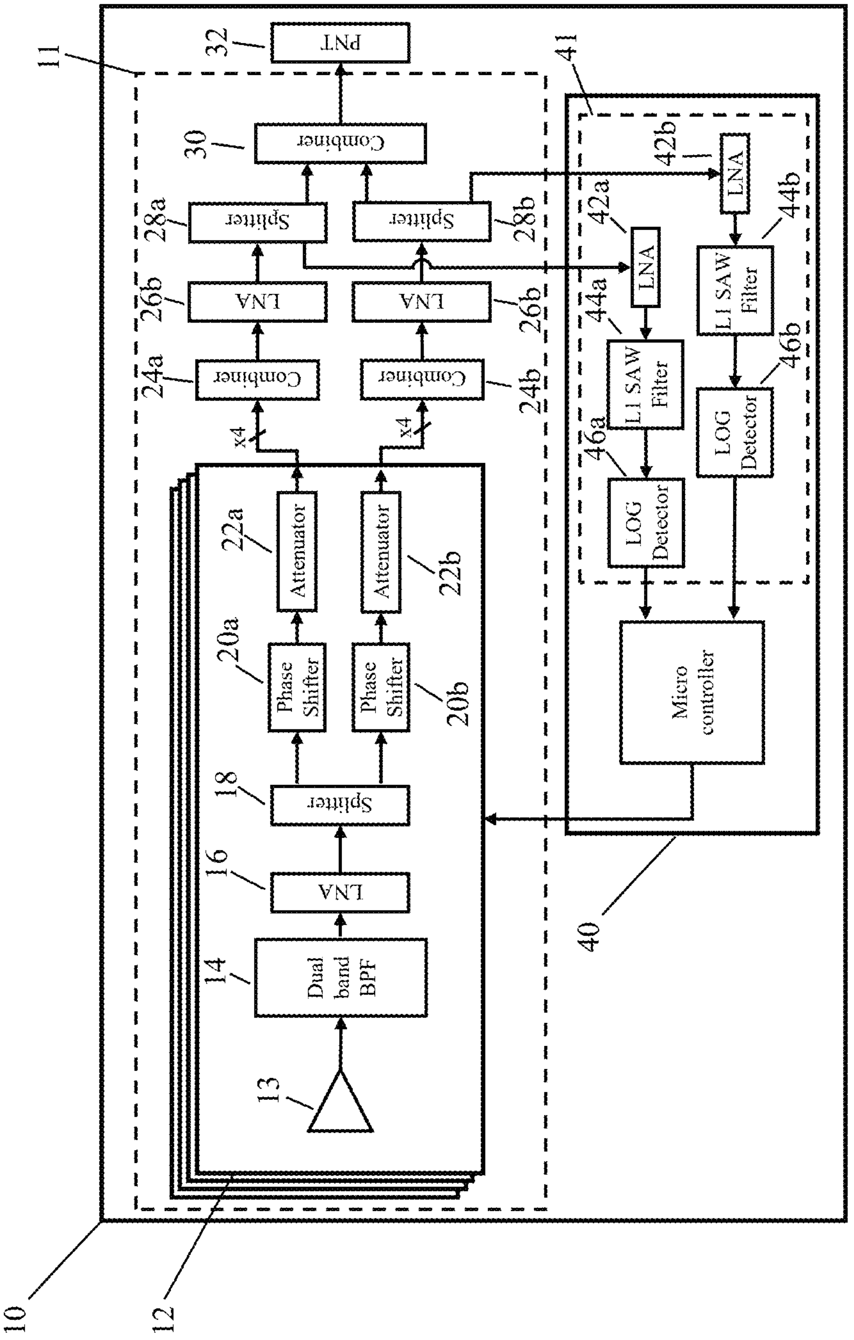
FIG. 1A is a schematic block diagram of an interference cancellation system with four antennas in accordance with embodiments of the present invention.

The exemplification set out herein illustrates an embodiment of the invention, and such exemplification is not to be construed as limiting the scope of the invention in any manner.

DETAILED DESCRIPTION OF EMBODIMENTS OF THE INVENTION

For the purpose of promoting an understanding of the principles of the invention, reference will now be made to the embodiment illustrated in the drawing, which is described below. It will nevertheless be understood that no limitation of the scope of the invention is thereby intended. The invention includes any alterations and further modifications in the illustrated device and described methods and further applications of the principles of the invention, which would normally occur to one skilled in the art to which the invention relates.

In embodiments, interference cancellation and jamming resistant hardware for interference cancellation systems is provided that includes two or more antennas for receiving a desired and interfering signal or signals and a circuit board with two or more paths for receiving global navigation satellite system signal plus interference from two or more antennas. Each path has one or more low noise amplifiers, bandpass filters, at least one numerically controlled analog phase shifter and a numerically controlled analog attenuator.

In embodiments, the algorithm to can be used to estimate the Eigen values and eigenvectors of the covariance matrix.

In embodiments, an embedded software is provided for implementing above described algorithm and jamming resistant hardware.

In embodiments, an algorithm is implemented on the above described jamming resistant hardware that uses the above described algorithm and the above described software to set the phase shifter values to the value set by the eigen vectors associated with the minimum Eigen values to cancel an interfering signal.

In exemplary embodiments, a system comprises: (A) N antennas; (B) N interference cancellation modules, each comprising: (i) a first input port configured to receive an electrical signal from a respective antenna of the N antennas, wherein the electrical signal comprises a global navigation satellite system portion and an interference portion; (ii) a first bandpass filter operably connected to the first input port; (iii) a first low noise amplifier operably connected to the first bandpass filter; (iv) M phase shifters operably connected to the first low noise amplifier; and (v) M attenuators, wherein each attenuator of the M attenuators is operably connected to a respective phase shifter of M phase shifters; (C) M analog signal combiners, wherein each analog signal combiner of the M analog signal combiners is operably connected to a respective attenuator of a respective interference cancellation module of the N interference cancellation modules; (D) M analog power splitters, wherein each analog power splitter of the M analog power splitters is operably connected to a respective analog signal combiner of the M analog signal combiners, and where-in each analog power splitter is configured to provide a respective output; and (E) a control module operably connected to the M analog power splitters and to the N interference cancellation modules, wherein the control module comprises: (i) an analog power detector operably connected to the M analog power splitters, and configured to obtain the respective output of each of the M analog power splitters and to provide power measurements; and (ii) a microcontroller operably connected to the analog power detector, comprising at least one processor and memory, wherein the microcontroller is configured to: (a) obtain the power measurements; and (b) deliver digital control commands to the N interference cancellation modules based on the power measurements. N is an integer and M is an integer.

In embodiments, the digital control commands comprise instructions to set a state of a respective phase shifter of the M phase shifters of a respective interference cancellation module. In embodiments, the digital control commands comprise instructions to set a state of a respective attenuator of the M attenuators of a respective interference cancellation module.

In embodiments, the respective phase shifter is a numerically controlled analog phase shifter. In embodiments, at least one attenuator of the M attenuators is a numerically controlled analog attenuator. In embodiments, each analog power splitter of the M analog power splitters is operably connected to a respective analog signal combiner via a respective second low noise amplifier of a set of M low noise amplifiers. In embodiments, the system further comprises a second bandpass filter operably connected to the first bandpass filter.

In embodiments, the global navigation satellite system portion is associated with signals in the L1 band. In embodiments, the global navigation satellite system portion is associated with signals in the L2 band. In embodiments, the global navigation satellite system portion is associated with signals in the L5 bands. In embodiments, N is an integer greater than two. In embodiments, M is an integer greater than two. In embodiments, N is equal to four. In embodiments, N is equal to eight. In embodiments, M is equal to one. In embodiments, M is equal to two. In embodiments, M is equal to three.

FIG. 1A depicts a schematic block diagram of an interference cancellation system 10 in accordance with embodiment of the present invention for four antennas. Interference cancellation system 10 of FIG. 1A includes analog radio frequency (RF) circuit 11 and controller 40. The analog RF circuit includes interference cancellation modules 12 (one shown), combiner 24*a* and 24*b*, low noise amplifiers (LNAs) 26*a*, 26*b*, splitters 28*a*, 28*b*, and a combiner 30. The interference cancellation module includes input port 13, dual-band bandpass filter (BPF) 14, LNA 16, splitter 18, phase shifters 20*a*, 20*b*, and attenuators 22*a*, 22*b*. The controller 40 includes analog measurement circuit 41 and microcontroller 48. Analog measurement circuit 41 includes LNAs 42*a*, 42*b*, L1 surface acoustic wave (SAW) filter 44*a*, L2 SAW filter 44*b*, and log detectors 46*a*, 46*b*.

In embodiments, the interference cancellation module may include an analog RF circuit (e.g., analog RF circuit 11). In embodiments, the analog RF circuit may include a number (N) of interference cancellation module(s) (e.g., interference cancellation module(s) 12). Each interference cancellation module of the N interference cancellation module(s) may include a respective input port (e.g., input port 13), a respective bandpass filter (BPF) (e.g., BPF 14) connected to the respective input port, a respective low noise amplifier (e.g., LNA 16) connected to the respective bandpass filter, a respective splitter (e.g., splitter 18) connected to the respective low noise amplifier, respective phase shifters (e.g., phase shifters 20*a*, 20*b*) connected to the respective splitter (e.g., splitter 18), and respective attenuators (e.g., attenuators 22*a*, 22*b*) connected to corresponding respective phase shifters (e.g., to phase shifters 20*a*, 20*b*). In embodiments, N is an integer.

In embodiments, each interference cancellation module may include a respective attenuator connected to a corresponding respective phase shifter. In such embodiments, the respective phase shifter may be operably connected to the low noise amplifier without the use of a splitter. In embodiments, each interference module may include respective bandpass filters and corresponding respective low noise amplifiers. Each of the plurality of bandpass filters may be configured to filter a band corresponding to a particular range of frequencies in the L-band range.

In embodiments, the bandpass filter may be a dual bandpass filter. In embodiments, the bandpass filter includes a third order miniaturized hairpin resonator, with a Chebyshev response with a passband equiripple of 0.04 dB. In embodiments, the bandpass filter includes a hairpin resonator with Ground Vias used in the second and fourth order of the resonator to reduce the resonator length of the hairpin line. In exemplary embodiments, the bandpass filter includes a cavity resonator filter, with a center frequency of 1575.42 MHz, a voltage with insertion less of less than 1 dB within the 20 MHz bandwidth, a voltage standing wave ration of 1.5:1 at the passband, and SMA male in/out connectors. In embodiments, the bandpass filter is 1.5 inches high, 2 inches wide, and 8 inches long, excluding connectors. In embodiments, the bandpass filter (e.g., BPF 14) may be connected to a cavity resonator filter. In embodiments, the cavity resonator bandpass filter may be connected to the input port (e.g., input port 13). The bandpass filter described herein is not intended to be limiting, and it is understood that the described bandpass filter is exemplary.

In embodiments, the low noise amplifier may be a single stage low noise amplifier. In embodiments, LNA 16 may be, for example, a MACOM Low Noise Amplifier for 0.5 to 3.0 GHz (Part No. MAAL-007304).

In embodiments, the splitter may be a power splitter. For example, the splitter may be a 2-Way 0-degree phase shift, 50 Ohm, 800 to 2100 MHZ Power Splitter/Combiner (Part No. GP2S+).

In embodiments, the phase shifters may be numerically controlled analog phase shifters. For example, the phase shifters may include an 8-bit digital phase shifter (e.g., a 1.7-2.2 GHz 8-bit RF Digital Phase Shifter, Part No. PE44820).

In embodiments, the attenuators may be numerically controlled. For example, the attenuators may include a digital step attenuator (e.g., a 31.5 dB, 400 MHz, 50 ohms, SMT Digital Step Attenuator, Part No. DAT-31R5A-SP+).

In embodiments, the analog RF circuit may include a first plurality of combiners (e.g., combiners 24*a*, 24*b*). Each combiner of the first plurality of combiners may be connected to respective outputs of the interference cancellation modules. For example, referring to FIG. 1A, combiner 24*a* is operably connected to respective attenuator 22*a* of interference cancellation module 12 and a first plurality of respective attenuators of the three interference cancellation modules not shown, and combiner 24*b* is operably connected to respective attenuator 22*b* of interference cancellation module 12 and a second plurality of respective attenuators of the three interference cancellation modules not shown. In embodiments, the analog RF circuit may include a first set of low noise amplifiers (e.g., LNAs 26*a*, 26*b*), wherein each low noise amplifier of the first set of low noise amplifiers is connected to respective combiners of the first plurality of combiners (e.g., to combiners 24*a*, 24*b*, respectively). In embodiments, the analog RF circuit may include a set of splitters (e.g., splitter 28*a*, 28*b*). In embodiments, each splitter of the set of splitters may be connected to a respective low noise amplifier (e.g., to LNAs 26*a*, 26*b*, respectively). In embodiments, the analog RF circuit may include a second combiner (e.g., combiner 30), which may be connected to the set of splitters (e.g., to splitters 28*a*, 28*b*, respectively). In embodiments, the second combiner may also be connected to a position, navigation, and timing system (PNT) (e.g., PNT 32). In embodiments, the analog RF circuit may include a first combiner, a low noise amplifier, and a splitter. In such embodiments, the splitter may be connected directly to the position, navigation, and timing system (e.g., PNT 32).

In embodiments, each combiner of the first plurality of combiners and the second combiner may include a power splitter/combiner. In embodiments, each combiner of the first plurality of combiners is configured to combine output signals from the N interference cancellation modules. For example, in embodiments, combiner 24*a* and combiner 24*b* may each be a 4-way, 0-degrees phase shift, 50 ohm, 690 to 2700 MHz rated power splitter/combiner capable (e.g., Part No. SEPS-4-272+). In embodiments, for example where there are four (N=4) or eight (N=8) interference cancellation modules, combiners 24*a* and combiner 24*b* may each be an 8-way, 0-degree, 50 ohm, 700 to 2700 MHz rated power splitter/combiner (e.g., Part No. SEPS-8-272+). In embodiments, the second combiner is configured to combine the outputs of each of the splitters of the analog RF circuit. In embodiments, each combiner of the first plurality of combiners comprise a second plurality of combiners.

In embodiments, the first set of low noise amplifiers of the analog RF circuit (e.g., LNA 26*a*, 26*b*) may include a single stage amplifier, to give an example. In embodiments, the low noise amplifiers of the analog RF circuit may be similar to the respective low noise amplifiers of the N interference cancellation modules.

In embodiments, the splitters of the analog RF circuit (e.g., splitters 28*a*, 28*b*) may be power split/combiners configured to split 2 signals. In embodiments, the splitters of the analog RF circuit may be similar to the respective splitters of the N interference cancellation modules.

In embodiments, the interference cancellation system may include a controller (e.g., controller 40). The controller may include an analog measurement circuit (e.g., analog measurement circuit 41). In embodiments, the analog measurement circuit (also referred to herein as an "analog power detector") may be configured to receive signals from the analog RF circuit (e.g., analog RF circuit 11) and measure interference. In embodiments, the analog measurement circuit may include a second set of low noise amplifiers (e.g., LNAs 42*a*, 42*b*). In embodiments, each low noise amplifier of the second set of low noise amplifiers may be connected to a respective splitter of the set of splitters (e.g., splitters 28*a*, 28*b*, respectively) of the analog RF circuit. In embodiments, the analog measurement circuit may include a plurality of surface acoustic wave (SAW) filters. In embodiments, the analog measurement circuit may include an L1 surface acoustic wave (SAW) filter (e.g., L1 SAW filter 44*a*). In embodiments, the L1 SAW filter may be connected to a respective low noise amplifier of the second set of low noise amplifiers (e.g., LNA 42*a*). In embodiments, the analog measurement circuit may include an L2 SAW filter (e.g., L2 SAW filter 44*a*). In embodiments, the L2 SAW filter may be connected to a respective low noise amplifier of the second set of low noise amplifiers (e.g., LNA 42*b*). In embodiments, the analog measurement circuit may include a plurality of logarithmic power detectors (e.g., log detectors 46*a*, 46*b*). In embodiments, the analog measurement circuit may include a first log detector (e.g., log detector 46*a*). In embodiments, the first log detector may be connected to the SAW filter. In embodiments, the analog measurement circuit may include a second log detector (e.g., log detector 46*b*). In embodiments, the second log detector may be connected to the SAW filter. In embodiments, each log detectors of the set of log detectors may be configured to detect the power of incoming signals.

In embodiments, the signals may include signals of interest in an applicable frequency band. For example, radio communication waveforms and weaker waveforms such as GPS and Galileo, as well as tactical communication waveforms (such PRC-163), satcom received signals on the ground, LTE signals, and the like.

In embodiments, the second set of low noise amplifiers may be configured to amplify signals received from the set of splitters. In embodiments, the second set of low noise amplifiers may include an amplifier similar to those in the first set of low noise amplifiers.

In embodiments, the SAW filters may be configured to reduce the strength of one or more particular frequencies. For example, the L1 SAW Filter may be configured to reduce strength of a signal in the L1 frequency (1575.42 MHz). Likewise, the L2 SAW Filter 44*b* may be configured to reduce the strength of one or more particular frequencies, for example, the L2 frequency (1227.60 MHz). L1 SAW Filter 44*a*, L2 SAW Filter 44*b* may be TriQuint SAW filters. The L1 SAW Filter, for example, having part No. 856561.

In embodiments, the controller includes a microcontroller (e.g., microcontroller 48). In embodiments, the microcontroller may be operably connected to an analog power detector. In embodiments, the microcontroller may be connected to the output of a set of log detectors. In embodiments, the microcontroller may be operably connected to respective phase shifters (e.g., phase shifters 20*a*, 20*b*) of the N interference cancellation modules. In embodiments, the microcontroller may be configured to change the state or configuration (e.g., the phase shift) of the respective phase shifters. In embodiments, the microcontroller may be operably connected to respective attenuators (e.g., attenuators 22*a*, 22*b*) of the N interference cancellation modules. In embodiments, the microcontroller may be configured to change the state or configuration (e.g., the amount of attenuation) of the respective attenuators. In embodiments, the microcontroller may be configured to calculate phase and attenuation states which reduces interference relative to desired signals (e.g., L1 and L2 signals).

In embodiments, the microcontroller may comprise one or more processors operably connected to memory, the memory configured to store computer executable code that, when executed by the one or more processors, cause the one or more processors to perform specified instructions (e.g., observe and calculate interference and output instructions and/or signals to reduce interference). In embodiments, the microcontroller may be part No. MSP430FR5994, to give an example.

Figure 1B:
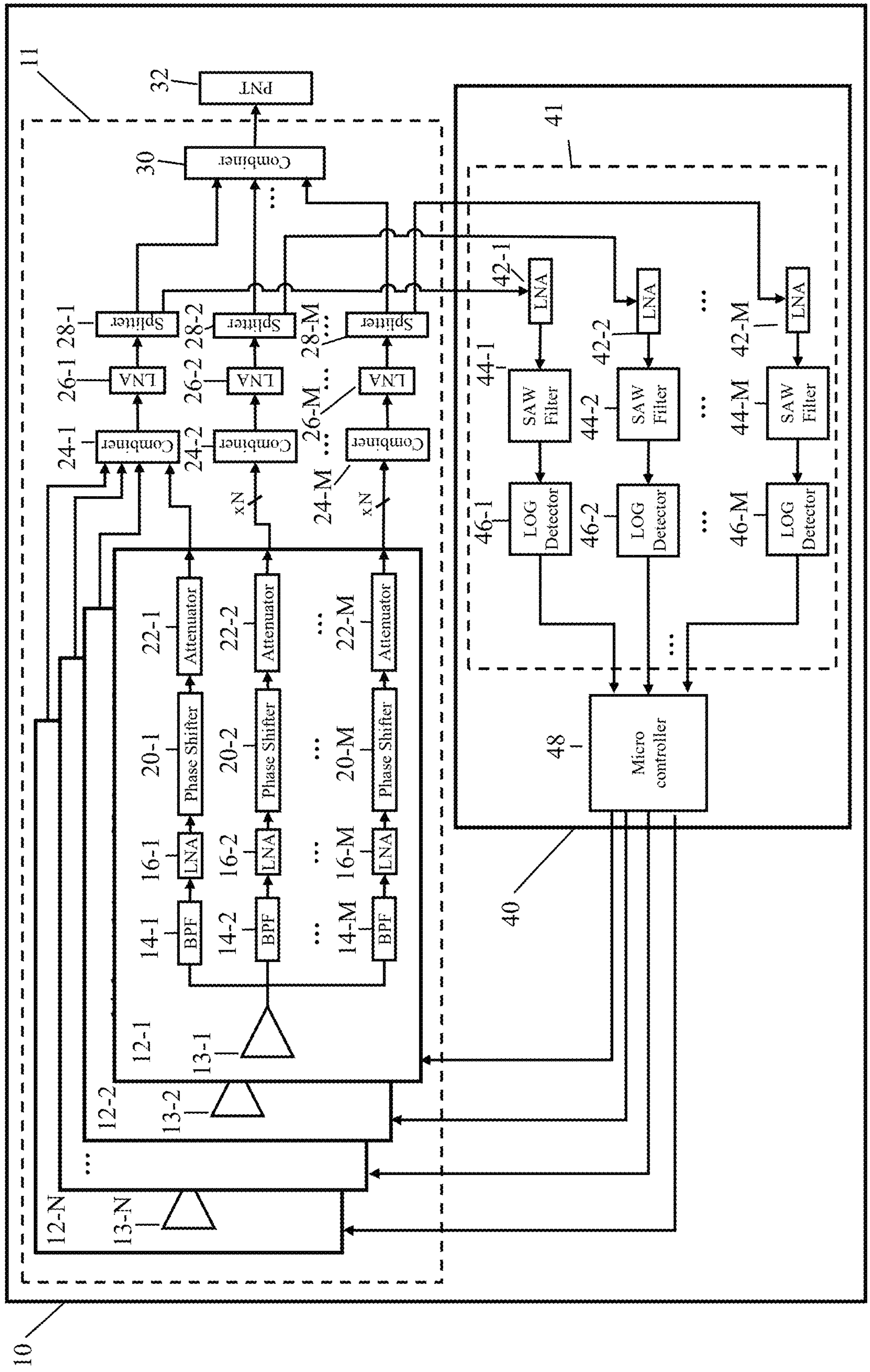
FIG. 1B is a schematic block diagram of an interference cancellation system extending to N antennas and M paths per antenna in accordance with embodiments of the present invention.

FIG. 1B depicts a schematic block diagram of an interference cancellation system 10 in accordance with embodiment of the present invention. As depicted in FIG. 1B, in embodiments, an interference cancellation system (e.g., interference cancellation system 10) may be configured to isolate M signals from N−1 sources of interference. In embodiments, received signals may travel along M paths of the interference cancellation system. In embodiments, the interference cancellation system includes an analog RF circuit (e.g., analog RF circuit 11) and a controller (e.g., controller 40).

In embodiments, the analog RF circuit includes a set of N interference cancellation modules (e.g., interference cancellation modules 12-1, 12-2 . . . 12-N). Each interference cancellation module includes a respective input port (e.g., input port 13-1, 13-2 . . . 13-N respectively). In embodiments, each interference cancellation module includes a respective set of bandpass filters (e.g., set 14-1, 14-2 . . . 14-N). In embodiments, each interfere cancellation module includes a first respective set of low noise amplifiers (e.g., sets 16-1, 16-2 . . . 16-N). In embodiments, each low noise amplifier is connected to a respective bandpass filter of the respective set of bandpass filters. In embodiments, the number of bandpass filters of the respective set of bandpass filters is equal to M. In embodiments, the number of bandpass filters of the respective set of bandpass filters is less than M. In embodiments, the number of low noise amplifiers is the same of as the number of bandpass filters. In embodiments, the interference cancellation module may include a splitter, which may be configured to create M signals. In embodiments, each interference cancellation module includes a respective set of M phase shifters (e.g., sets 20-1, 20-2 . . . 20-N). In embodiments, each phase shifter is operatively connected to a respective low noise amplifier of the respective set of low noise amplifiers. In embodiments, each interference cancellation module includes a respective set of M attenuators (e.g., sets 22-1, 22-2 . . . 22-N). In embodiments, each attenuator of the is operatively connected to a respective phase shifter of the respective set of phase shifters.

Still referring to FIG. 1B, the analog RF circuit includes a first set of M combiners (e.g., combiners 24-1, 24-2 . . . 24-M), a second set of M low noise amplifiers (e.g., LNAs 26-1, 26-2 . . . 26-M), a first set of M splitters (e.g., splitters 28-1, 28-2 . . . 28-M), and a second combiner. In embodiments, each of the combiners of the first set of combiners is configured to obtain the output of (e.g., by being connected to) a corresponding attenuator of the respective set of attenuators of each interference cancellation module. In embodiments, M is an integer. In embodiments, each of the low noise amplifiers of the second set of low noise amplifiers is connected to a respective combiner of the first set of combiners (e.g., LNA 26-1 is connected to combiner 24-1, LNA 26-2 is connected to combiner 24-2, LNA 26-M is connected to comber 24-M). In embodiments, each of the splitters of the first set of splitters is connected to a respective low noise amplifier of the first set of low noise amplifiers (e.g., splitter 28-1 is connected to LNA 26-1, splitter 28-2 is connected to LNA 26-2, splitter 28-M is connected to LNA 26-M). In embodiments the second combiner is connected to the first set of splitters. In embodiments, the second combiner is connected a position, navigation, and timing system (e.g., PNT 32).

Still referring to FIG. 1B, the controller (e.g., controller 40) includes an analog measurement circuit (e.g., analog measurement circuit 41) and a microcontroller 48. In embodiments, the analog measurement circuit includes a second set of N low noise amplifiers (e.g., LNAs 42-1, 42-2 . . . 42-M), a set of N SAW filters (e.g., SAW filters 44-1, 44-2 . . . 44-M), and a set of N log detectors (e.g., log detectors 46-1, 46-2 . . . 46-M). In embodiments, each of the low noise amplifiers of the second set of low noise amplifiers is connected to a respective splitter of the first set of splitters (e.g., LNA 42-1 is connected to splitter 28-1, LNA 42-2 is connected to splitter 28-2, LNA 42-M is connected to splitter 28-M). In embodiments, each of the SAW filters of the set of SAW filters is connected to a respective low noise amplifier of the second set of splitters (e.g., SAW filter 44-1 is connected to LNA 42-1, SAW filter 44-2 is connected to LNA 42-2, SAW filter 44-M is connected to LNA 42-M). In embodiments, each of the log detectors of the set of log detectors is connected to a respective SAW filter the set of SAW filters (e.g., log detector 46-1 is connected to SAW filter 44-1, log detector 46-2 is connected to SAW filter 44-2, log detector 46-M is connected to SAW filter 44-M). In embodiments, the microcontroller 48 may be connected to the set of log detectors.

In embodiments, the components depicted in FIG. 1B may be similar to the components depicted in FIG. 1A.

In embodiments, the analog RF circuit may include additional or alternative (relative to the embodiment depicted in FIG. 1A) sets of low noise amplifiers, SAW filters, and logarithmic detectors, which may be connected to the analog RF circuit and the microcontroller. For example, the analog RF circuit may include a third low noise amplifier, an L5 SAW filter, and a third log detector. Continuing the example, the third low noise amplifier may be connected to an L5 SAW filter configured to reduce the strength of frequencies at the L5 frequency (1176 MHz), and the L5 SAW filter may be connected to a third detector. Continuing the example, each of the N interference cancellation modules may include additional corresponding modules, for example, a third phase shifter, a third attenuator, a third combiner of the first set of combiners, a third low noise amplifier of the first set of low noise amplifiers, and a third splitter of the first set of splitters. As another example, in embodiments, the controller may include only a single set of a LNA, SAW Filter, and Logarithmic detector.

In embodiments, the interference cancellation system (e.g., interference cancellation system 10) may be configured to receive radio frequency (RF) signals via one or more antennas. Each of the one or more antennas may be connected to a respective input port (e.g., input port 13). In embodiments, the RF signals include signals in the L-band (between 1 GHz and 2 GHz). In embodiments, the RF signals include signals at the L1 frequency (1575.42 MHz). In embodiments, the RF signals include signals at the L2 frequency (1227.60 MHz). In embodiments, the RF signals include signals at the L5 frequency (1176.45 MHz). In embodiments, the interference cancellation module system is configured to receive signals at the L1 frequency, the L2 frequency, and/or the L5 frequency.

In embodiments, the one or more antennas converts received analog radio frequency signals to analog electrical signals. In embodiments, each antenna of the one or more antennas may correspond to a respective input port of an interference cancellation module. In embodiments, each antenna may correspond to the respective input ports of a plurality of interference cancellation modules. In embodiments, the respective input port (e.g., input port 13) of a given interference cancellation module obtains respective analog electrical signals from an antenna and passes them to a respective bandpass filter (e.g., BPF 14).

In embodiments, the respective bandpass filter filters the respective analog electrical signals, generating respective filtered signals. In embodiments, a respective low noise amplifier (e.g., LNA 16) amplifies the respective filtered signals, generating a respective amplified signal. In embodiments, a respective splitter (e.g., splitter 18) splits the respective amplified signal into a plurality of respective split signals, which may comprise a first respective split signal and a second respective split signal. The first respective split signal may include the whole respective amplified signal. The second respective split signal may include the whole respective amplified signal.

In embodiments, a first respective phase shifter (e.g., phase shifter 20*a*) may obtain the first respective split signal and generate a first respective phase shifted signal. Similarly, a second respective phase shifter (e.g., phase shifter 20*b*) may obtain the second respective split signal and may generate a second respective phase shifted signal. The first respective phase shifted signal may be the first respective split signal shifted by a number of degrees (e.g., 0 degrees, 45 degrees, 90 degrees, to name a few). The second respective phase shifted signal may be the second respective split signal shifted by a number of degrees (e.g., 0 degrees, 45 degrees, 90 degrees, to name a few). In embodiments, a microcontroller (e.g., microcontroller 48) may control the state and/or configuration of the respective phase shifters (e.g., the phase shift produced by the respective phase shifters may be set, modified, reset, to name a few examples).

In embodiments, a first respective attenuator (e.g., attenuator 22*a*) may obtain the first respective phase shifted signal and may output a first respective attenuated signal. Similarly, in embodiments, a second respective attenuator (e.g., attenuator 22*b*) may obtain the second respective phase shifted signal and may output a second respective attenuated signal. In embodiments, a microcontroller (e.g., microcontroller 48) may control the state and/or configuration of the respective attenuators (e.g., the attenuation performed by the respective attenuators may be set, modified, reset, to name a few examples).

In embodiments, each interference cancellation module of the N interference cancellation modules may output a respective output. In embodiments, the respective output may include a first respective output, which may be the first attenuated signal. In embodiments, the respective output may include a second respective output, which may be the second attenuated signal.

In embodiments, each combiner of the first plurality of combiners (e.g., combiner 24*a*, 24*b*) may combine an output of each the N interference cancellation modules to generate a combined signal. For example, combiner 24*a* may combine the first respective output (e.g., the first attenuated signal) of each of the N interference cancellation modules to generate a first combined signal. Likewise, combiner 24*b* may combine the second respective output (e.g., the second attenuated signal) of each of the N interference cancellation modules to generate a second combined signal.

In embodiments, a first low noise amplifier (e.g., LNA 26*a*) of the first set of low noise amplifiers may amplify the first combined signal to generate a first amplified combined signal. In embodiments, a second low noise amplifier (e.g., LNA 26*b*) of the first set of low noise amplifiers may amplify the second combined signal to generate a second amplified combined signal.

In embodiments, a first splitter (e.g., splitter 28*a*) of the first set of splitters (splitters 28*a*, 28*b*) may split the first amplified combined signal for transmission to a low noise amplifier of the second set of low noise amplifiers (e.g., LNA 28*a*) and the second combiner 30. Similarly, a second splitter (e.g., splitter 28*b*) of the first set of splitters may split the second amplified combined signal for transmission to a low noise amplifier of the second set of low noise amplifiers (e.g., LNA 28*b*) and the second combiner 30.

In embodiments, the second combiner (e.g., combiner 30) may generate a third combined signal by combining the first amplified combined signal and the second amplified combined signal. The third combined signal may be sent to a position, navigation, and timing system (e.g., PNT 32) for use.

In embodiments, each of the low noise amplifiers of the second set of low noise amplifiers (e.g., LNAs 42*a*, 42*b*) may obtain a respective amplified combined signal from the first set of splitters. For example, referring to FIG. 1A, LNA 42*a* may obtain the first obtain first amplified combined signal from Splitter 28*a* and LNA 42*b* may obtain the second amplified combined signal from Splitter 28*b*. In embodiments, each of the low noise amplifiers of the second set of low noise amplifiers may generate a respective amplified measurement signal. For example, referring to FIG. 1A, LNA 42*a* may generate a first amplified measurement signal and LNA 42*b* may generate a second amplified measurement signal. In embodiments, the low noise amplifiers may change the amplitude of the interference signal to a level detectable by the log-detector. An advantage of doing so is that it may also keep the overall noise low, reducing the amount of thermal noise added to GPS signals received.

In embodiments, saw filters may reduce the strength of GPS signals from the first and second amplified measurement signals so that interference may be measured. In embodiments, an L1 SAW Filter (e.g., L1 SAW Filter 44*a*) may obtain the first amplified measurement signal and generate a first interference signal. In embodiments, an L2 SAW Filter (e.g., L2 SAW Filter 44*b*) may obtain the second amplified measurement signal and generate a second interference signal.

In embodiments, logarithmic detectors may measure the interference power from multiple antennas. In embodiments, the first set of log detectors may obtain the first interference signal and second interference signal (e.g., log detector 46*a* may obtain the first interference signal and log detector 46*b* may obtain the second interference signal). In embodiments, the first set of log detectors may generate a first interference power measurement and second interference power measurement, corresponding to the power level of the first and second interference signals.

In embodiments, the microcontroller (e.g., microcontroller 48) may operate to reduce the interference based on measurement from the log detector. In embodiments, microcontroller may obtain power measurements (e.g., the first interference power measurement and second interference power measurement from log detectors 46*a*, 46*b*, respectively) over a period of time. In embodiments, the microcontroller may determine the appropriate states for the phase shifters and attenuators of each of the N interference cancellation modules (e.g., interference cancellation modules 12) so as to reduce interference in the signals supplied to the position, navigation and timing system (e.g., PNT 32) based on the power measurements obtained.

In embodiments, a 1 millisecond period may be used to adjust phase shifters (e.g., phase shifters 20*a*, 20*b* and/or other phase shifters in an interference cancellation module) with different phases. The resulting power with phases $\phi_l[n]$ applied at the n-th time instant to the l-th antenna can be expressed as follows:

$$P[n] = \left| \sum_{l=1}^{4} e^{j\phi_l[n]} r_l[n] \right|^2$$

where $r_l[n]$ is the received signal, and for a single interferer, the received signal can be represented as follows:

$$r_l[n] = \alpha_l i[n] + n_l[n]$$

where $\alpha_l$ is the complex channel gain for the l-th antenna, i[n] is the interference signal, and $n_l[n]$ is the background thermal noise.

In electronics, complex gain is the effect that circuitry has on the amplitude and phase of an incoming signal. The term complex is used because mathematically this effect can be expressed as a complex number.

Combining the above equations, a third equation may be obtained:

$$P[n] = P_i \alpha^H \phi[n] \phi[n]^H \alpha + \tilde{n}[n]$$

where $P_i$ is the transmitted power of the interferer (or average received power, if the channel gains are normalized). In embodiments, the total received power P[n] may be measured in intervals of 10 microseconds with random phase shifts, and in such embodiments, 100 measurements are obtained in a duration of 1000 microseconds. Based on these measurements, the microcontroller may estimate the channel gains offline using a gradient descent algorithm on the following cost function:

$$C(\hat{\alpha}) = \sum_{n=0}^{N-1} \left| P[n] - P_i \hat{\alpha}^H \phi[n] \phi[n]^H \hat{\alpha} \right|^2$$

In embodiments, the average received power $P_i$ may be estimated by measuring the received power at each antenna sequentially, and then averaging the powers across all the antennas. Once the microcontroller has estimated the channel gains a, the phase-shifts that result in minimizing the overall received power may be determined, i.e., phases that minimize $|\phi^H\hat{\alpha}|$. The resulting interference protection is represented by $|\alpha^H\alpha|^2/|\phi^H\hat{\alpha}|^2$.

In embodiments, another method may be used by the microcontroller 48 to estimate the direction of the arrival of interference and GNSS signals using the power measurements from the log detectors. The following may be measured and estimated:

1. $P_l = E\left[|y_l|^2\right]$
2. $P^R_{m,l} = E\left[|y_l + y_m|^2\right] = E\left[|y_l|^2\right] = E\left[|y_m|^2\right] + 2\mathrm{Re}\{E[y_l y_m^*]\}$
3. $P^I_{m,l} = E\left[|y_l + jy_m|^2\right] = E\left[|y_l|^2\right] + E\left[|y_m|^2\right] - 2\mathrm{Im}\{E[y_l y_m^*]\}$ The covariance matrix of the received signal vector may be given by: $R=E[yy^H]$, with $R_{l,m}=E[y_l y^*_m]$.

In embodiments, using the above measurements, the microcontroller may thereby estimate the covariance matrix. In embodiments, the large eigenvalues of the covariance matrix correspond to the interference, and interference may therefore be reduced by selecting a beamforming vector that minimizes the correlation to the strong eigenvector(s). In embodiments, matrix is first made to be positive semi-definite. In exemplary embodiments, this algorithm provides interference protection between 20 and 30 dB, from interference power of −100 dBm to −70 dBm.

In embodiments, based on one or more of the above methods, the microcontroller may modify the state of one or more of the phase shifters (e.g., phase shifters 22*a*, 22*b*) to the phases that minimize $|\phi^H\hat{a}|$ and/or the correlation to the strongest eigenvectors. The state of attenuators may also be modified. In embodiments, if no phases need to be modified, the microcontroller may continue making state calculations. In embodiments, the microcontroller may calculate state changes needed and change states simultaneously. In embodiments, the microcontroller may calculate state changes need and change states sequentially.

In embodiments, the microcontroller may implement the methods based on instructions stored in memory. In embodiments, the instructions may include instructions to setup switches, to measure incoming signals (e.g., via sampling of the log detectors, with a median of 32 samples used), to form a co-variance matrix and calculate singular value decomposition (SVD), to set phase shifter and attenuator values based on the 2nd to 4th eigenvectors (e.g., in a system with four measurements), and/or to measure the log detector to determine the minimum power. In embodiments, the microcontroller may continuously update the SVD, and/or may take measurements periodically (e.g., every minute).

Figure 2A:
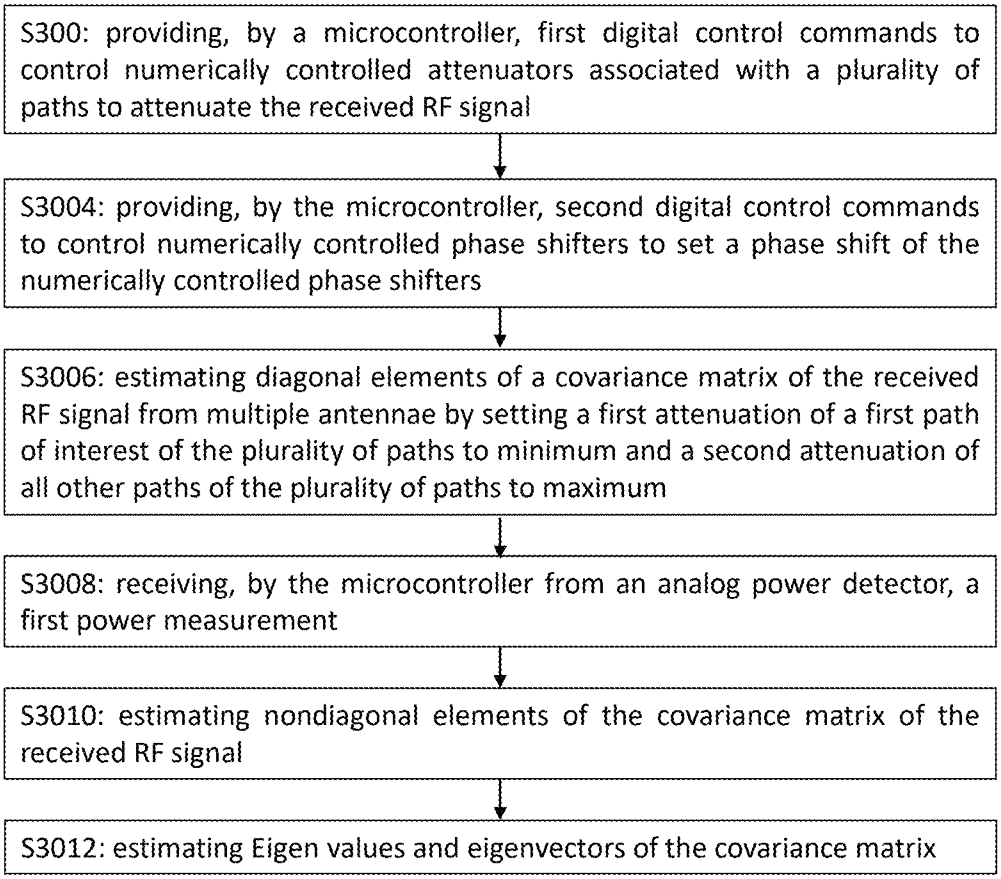
FIGS. 2A-2B depict an exemplary flowchart in accordance with embodiments of the present disclosure.
Figure 2B:
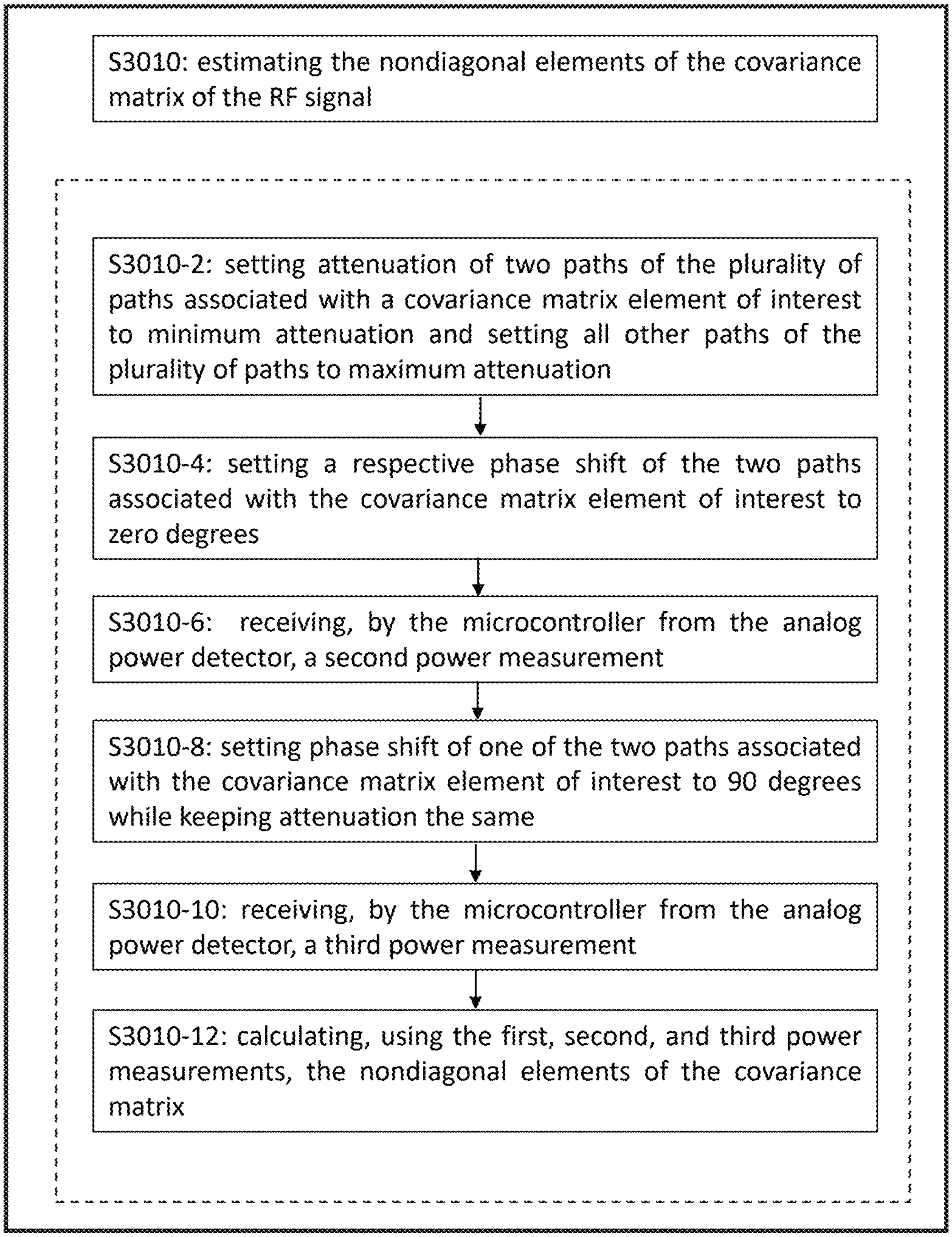

FIGS. 2A and 2B depict an exemplary flowchart of a method for estimating a covariance matrix of a received RF signal including a global navigation satellite system portion and an interference portion, in accordance with embodiments of the present disclosure.

At step S3002, the method comprises providing, by a microcontroller, first digital control commands to control numerically controlled attenuators associated with a plurality of paths to attenuate the received RF signal. At step S3004, the method comprises providing, by the microcontroller, second digital control commands to control numerically controlled phase shifters to set a phase shift of the numerically controlled phase shifters. The numerically controlled phase shifters are included in the plurality of paths associated with the numerically controlled attenuators. At step S3006, the method comprises estimating diagonal elements of a covariance matrix of the received RF signal from multiple antennae by setting a first attenuation of a first path of interest of the plurality of paths to minimum and a second attenuation of all other paths of the plurality of paths to maximum. In embodiments, the diagonal elements are real numbers. In embodiments, each of the diagonal elements may represent the power of a particular path. At step S3008, the method comprises receiving, by the microcontroller from an analog power detector, a first power measurement.

At step S3010, the method comprises estimating nondiagonal elements of the covariance matrix of the received RF signal by the steps of: S3010-2 setting attenuation of two paths of the plurality of paths associated with a covariance matrix element of interest to minimum attenuation and setting all other paths of the plurality of paths to maximum attenuation; S3010-4 setting a respective phase shift of the two paths associated with the covariance matrix element of interest to zero degrees; S3010-6 receiving, by the microcontroller from the analog power detector, a second power measurement; S3010-8 setting phase shift of one of the two paths associated with the covariance matrix element of interest to 90 degrees while keeping attenuation constant; S3010-10 receiving, by the microcontroller from the analog power detector, a third power measurement, and S3010-12 calculating, using the first, second, and third power measurements, the nondiagonal elements of the covariance matrix. In embodiments, all, some, or none of the nondiagonal elements may be real numbers. In embodiments, all, some, or none of the nondiagonal elements may be complex numbers.

In embodiments, at step S3012, the method further comprises estimating Eigen values and eigenvectors of the covariance matrix. In embodiments, the second power measurement is independent of the third power measurement.

While the invention has been taught with specific reference to the embodiments discussed herein, one skilled in the art will recognize that changes can be made in form and detail without departing from the spirit and scope of the invention. For example, while specific components are described, it will be understood that comparable components may be used to achieve a similar functionality while remaining in the scope of the invention. Components may be combined, and components performing similar functionalities as those described herein may be added. The described embodiments are to be considered, therefore, in all respects only as illustrative and not restrictive. As such, the scope of the invention is indicated by accompanying claims of any nonprovisional application filed on the invention rather than by the description, drawing and summary of invention herein.

What is claimed is:

1. A system comprising:

(A) N antennas;

(B) N interference cancellation modules, each comprising:

(i) a first input port configured to receive an electrical signal from a respective antenna of the N antennas, wherein the electrical signal comprises a global navigation satellite system portion and an interference portion;

(ii) a first bandpass filter operably connected to the first input port;

(iii) a first low noise amplifier operably connected to the first bandpass filter;

(iv) M phase shifters operably connected to the first low noise amplifier; and (v) M attenuators, wherein each attenuator of the M attenuators is operably connected to a respective phase shifter of M phase shifters;

(C) M analog signal combiners, wherein each analog signal combiner of the M analog signal combiners is operably connected to a respective attenuator of a respective interference cancellation module of the N interference cancellation modules;

(D) M analog power splitters, wherein each analog power splitter of the M analog power splitters is operably connected to a respective analog signal combiner of the M analog signal combiners, and wherein each analog power splitter is configured to provide a respective output; and (E) a control module operably connected to the M analog power splitters and to the N interference cancellation modules, wherein the control module comprises:

(i) an analog power detector operably connected to the M analog power splitters, and configured to obtain the respective output of each of the M analog power splitters and to provide power measurements; and (ii) a microcontroller operably connected to the analog power detector, comprising at least one processor and memory, wherein the microcontroller is configured to:

(a) obtain the power measurements; and (b) deliver digital control commands to the N interference cancellation modules based on the power measurements, wherein N is an integer and M is an integer.

2. The system of claim 1, wherein the digital control commands comprise instructions to set a state of a respective phase shifter of the M phase shifters of a respective interference cancellation module.

3. The system of claim 1, wherein the digital control commands comprise instructions to set a state of a respective attenuator of the M attenuators of a respective interference cancellation module.

4. The system of claim 1, wherein the respective phase shifter is a numerically controlled analog phase shifter.

5. The system of claim 1, wherein at least one attenuator of the M attenuators is a numerically controlled analog attenuator.

6. The system of claim 1, wherein each analog power splitter of the M analog power splitters is operably connected to a respective analog signal combiner via a respective second low noise amplifier of a set of M low noise amplifiers.

7. The system of claim 1, wherein the system further comprises a second bandpass filter operably connected to the first bandpass filter.

8. The system of claim 1, wherein the global navigation satellite system portion is associated with signals in the L1 band.

9. The system of claim 1, wherein the global navigation satellite system portion is associated with signals in the L2 band.

10. The system of claim 1, wherein the global navigation satellite system portion is associated with signals in the L5 bands.

11. The system of claim 1, wherein N is an integer greater than two.

12. The system of claim 1, wherein M is an integer greater than two.

13. The system of claim 1, wherein N is equal to four.

14. The system of claim 1, wherein N is equal to eight.

15. The system of claim 1, wherein M is equal to one.

16. The system of claim 1, wherein M is equal to two.

17. The system of claim 1, wherein M is equal to three.

18. A method for estimating a covariance matrix of a received RF signal including a global navigation satellite system portion and an interference portion, the method comprising:

(A) providing, by a microcontroller, first digital control commands to control numerically controlled attenuators associated with a plurality of paths to attenuate the received RF signal;

(B) providing, by the microcontroller, second digital control commands to control numerically controlled phase shifters to set a phase shift of the numerically controlled phase shifters wherein the numerically controlled phase shifters are included in the plurality of paths associated with the numerically controlled attenuators;

(C) estimating diagonal elements of a covariance matrix of the received RF signal from multiple antennae by setting a first attenuation of a first path of interest of the plurality of paths to minimum and a second attenuation of all other paths of the plurality of paths to maximum;

(D) receiving, by the microcontroller from an analog power detector, a first power measurement; and (E) estimating nondiagonal elements of the covariance matrix of the received RF signal by the steps of:

(i) setting attenuation of two paths of the plurality of paths associated with a covariance matrix element of interest to minimum attenuation and setting all other paths of the plurality of paths to maximum attenuation;

(ii) setting a respective phase shift of the two paths associated with the covariance matrix element of interest to zero degrees;

(iii) receiving, by the microcontroller from the analog power detector, a second power measurement;

(iv) setting phase shift of one of the two paths associated with the covariance matrix element of interest to 90 degrees while keeping attenuation constant;

(v) receiving, by the microcontroller from the analog power detector, a third power measurement, and (vi) calculating, using the first, second, and third power measurements, the nondiagonal elements of the covariance matrix.

19. The method of claim 18, wherein the method further comprises estimating Eigen values and eigenvectors of the covariance matrix.

20. The method of claim 18, wherein the second power measurement is independent of the third power measurement.

* * * * *